Nov. 17, 1936.   W. C. DEHN ET AL   2,061,396
INTERNAL COMBUSTION ENGINE
Filed March 31, 1934
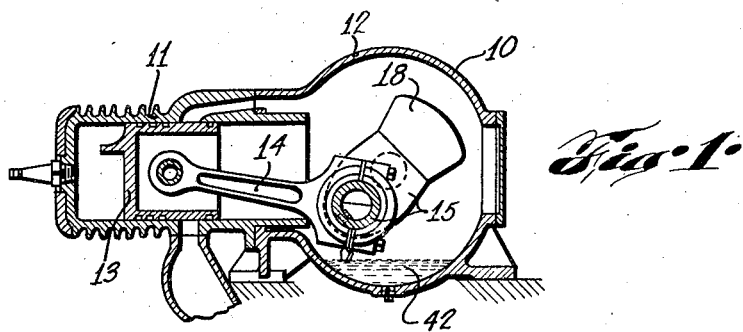
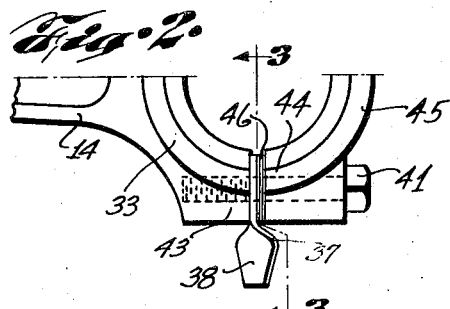
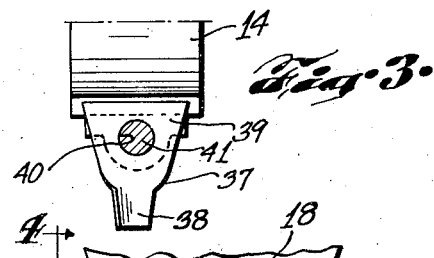
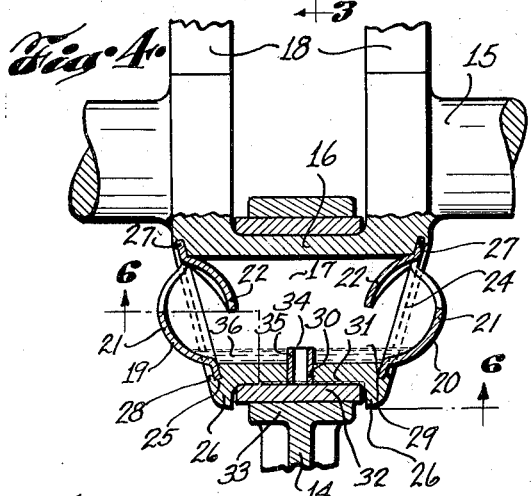
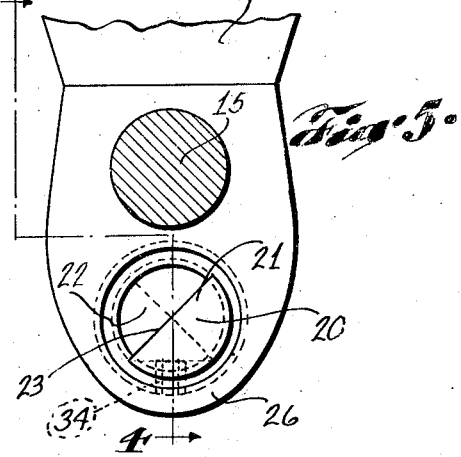
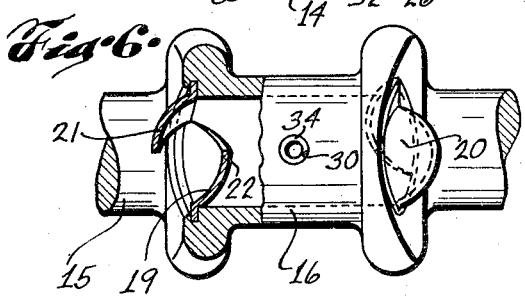
INVENTORS
WILLIAM C. DEHN
MILTON H. RIX
BY
Roy M. Eilers
ATTORNEY.

Patented Nov. 17, 1936

2,061,396

UNITED STATES PATENT OFFICE 2,061,396

INTERNAL COMBUSTION ENGINE

William C. Dehn and Milton H. Rix, Three Rivers, Mich., assignors to Fairbanks, Morse & Company, Chicago, Ill., a corporation of Illinois Application March 31, 1934, Serial No. 718,374

18 Claims. (Cl. 184—11)

This invention relates to improvements in internal combustion engines, and more particularly to improved means for positively lubricating connecting rod bushings and other rotating and reciprocating parts, particularly of engines of two cycle type.

The usual practice heretofore employed in effecting lubrication of connecting rod bushings and other internal working parts of two cycle engines, has been to utilize, through appropriate means, oil which has been mixed with the gasoline charge and introduced into the engine crankcase through the carburetion system. The lubricant enters the crankcase in a vaporous state and is circulated about the working parts of the engine as a result of the fanning action of the revolving crankshaft and counterbalance assembly. Small apertures or ducts are generally provided in the connecting rod caps and bushings, and liberal side clearances are allowed in fitting the bushings on the crankshaft pins, whereby the lubricant vapor may more readily contact with the bearing surfaces of the crankpins and connecting rod bushings. This older arrangement for effecting lubrication of the working parts of a two cycle engine has been found fairly adequate for engines of comparatively low operating speeds. However, the use of the conventional arrangement, in connection with two cycle engines designed for relatively high speed operation, for effecting lubrication of the working parts, has been found to be wholly inadequate and unsatisfactory. The natural forces of rotation and reciprocation at high speeds seriously oppose the successful operation of the conventional lubricating arrangement, as may be readily appreciated. These same forces affect the slower speed engines, but to such a small extent as to be almost negligible in comparison.

Furthermore, the conventional method of lubrication does not provide for any well defined control of the circulation of the air, gasoline and lubricant mixture within the engine crankcase. Actual tests made on an engine of two cycle type indicate that a positive control of the lubricant vapor circulation within the crankcase is highly advantageous in obtaining more effective lubrication and cooling of the working parts of the engine.

The principal objects of the present invention, therefore are to provide, in a two cycle internal combustion engine, an improved lubricating means for the connecting rod bushing or bushings, which will positively and effectively lubricate the bushing at high engine speeds, as well as at low speeds; and to provide means for more readily effecting lubrication of other internal working parts of the engine, and for controlling the circulation of the air, gasoline and lubricant mixture within the engine crankcase, to improve oiling and cooling of parts therein.

Another object is to provide, in a two cycle engine, an improved lubricating means which is adapted for utilizing the centrifugal forces resulting from the rotation of the engine parts, to effect a positive lubrication of the connecting rod bushing, under all operating conditions of the engine.

An additional object is to provide, in a crankcase scavenging engine, improved means for collecting lubricant and for directing the collected lubricant into a chamber or reservoir within the crank pin; and further, to provide means for maintaining a quantity of lubricant within the pin reservoir, particularly at high engine speeds, while lubricant is being fed to the bearing surface of the crank pin bushing. The presence of a quantity of lubricant within the pin during the operation of the engine materially aids in reducing the bearing temperature.

A further object is attained in the provision, in a two cycle engine, of means forming within the crank pin, a reservoir for the retention of a quantity of lubricant therein, and of means providing a lubricant feed connection between the reservoir and bearing bushing, whereby the bushing may be positively and continuously lubricated, even though the supply of lubricant to the reservoir be temporarily cut off.

A still further object is attained in the provision of an improved device for controlling the circulation of combustible mixture and oil within the crankcase of a two cycle engine, which device is adapted to direct the lubricant-containing vapor onto crank pin lubricant collectors. The device is further adapted to dip into the lubricant condensing and collecting in the crankcase and to throw such lubricant into the path of the collectors, as they revolve with the crank pin.

The presently improved means for lubricating the crank pin bushings and other internal working parts of a two cycle engine, are designed to obtain a greater smoothness and a more uniform maintenance of speed and power over extended periods of operation.

Further objects and advantages will appear from the following specification and from the appended drawing, in which:

Fig. 1 is a longitudinal sectional elevation of a preferred form of two cycle engine, embodying the improvements of the present invention; Fig. 2 is an enlarged fragmentary elevation of a portion of the engine connecting rod and crank pin, illustrating the mounting arrangement of a preferred form of lubricant circulation control device; Fig. 3 is a transverse elevation of the control device, as viewed along line 3—3 in Fig. 2; Fig. 4 is a sectional elevation of the crank pin portion of the engine crankshaft, illustrating the preferred form and arrangement of the lubricating means for the pin bushing, as viewed along line 4—4 in Fig. 5; Fig. 5 is an end elevation of the crank pin and a portion of the lubricating means; Fig. 6 is a partial sectional elevation of the crank pin, as taken along line 6—6 in Fig. 4, Fig. 7 is a detail end elevation of an oil collector member.

Referring, now, to the drawing by numerals of reference, 10 designates, generally, a preferred form of internal combustion engine of two cycle or crankcase scavenging type, embodying the improvements of the present invention. It is to be understood, however, that the application of the improved lubricating means of this invention is in no wise limited to the particular form of two cycle engine illustrated, as other forms of single or multi-cylinder engine may be benefited and their operation greatly improved by the use of the presently improved lubricating means. The engine illustrated by way of example, includes a cylinder 11, crankcase 12, piston 13, connecting rod assembly 14, and crankshaft 15. The crankshaft is or may be of the usual form, with the exception of the crank portion or crank pin 16 which is provided with an axial chamber or bore 17, open at each end. Counter-weights 18 may be provided on the crankshaft 15 for balancing the shaft, according to the usual practice.

With particular reference to Figs. 4 to 7, the otherwise open ends of the crank pin bore 17 are preferably covered by lubricant collector members 19 and 20, the collector 19 being disposed on the left hand end of the crank pin (Fig. 4) and the collector 20 on the right hand end thereof. Each collector member is essentially a louvred disc formed with a substantially semi-circular lip or cup-shaped vane portion 21 extending outwardly from one side of the disc, and a similar lip element 22 disposed in relatively inverted relation on the opposite side, and on the opposite half of the disc. The substantially straight edges 23 of the vanes 21 and 22 are preferably arranged to lie in a single, axial plane of the disc, thereby providing a tortuous or reversely curved passage 24 through the collector member, as shown by the arrow in Fig. 7. The passage through each collector disc provides a lubricant inlet or port to the hollow crank pin, the outlet or provision for delivery of oil to the journal surface of the crank pin being hereinafter described. A counterbored seat 25 is provided in each side wall or cheek portion 26 of the crank pin, to receive the rim portion 27 of one of the collector members. When each collector member has been properly seated and positioned, as hereinafter described, the edge portion 28 of the seat 25 is deformed or peened over to secure the collector member in assembly and also, to effect an oil-tight joint. It will be observed from Figs. 4 and 6, that one of the lips of each collector extends within the crank bore or oil reservoir 17, and the other extends outwardly from the crank cheek 26. The outwardly extending lips, such as 21 of the present, preferred example, form lubricant collecting portions or scoops, which collect or scoop up the lubricant-containing vapor circulating within the crankcase, when the crankshaft and crank are rotated. As shown in Figs. 5 and 6, assuming the engine to be of reversible type, the collector members are so angularly related with respect to each other that one operates to best advantage in one direction of crank rotation, and the other more effectively performs its function in the opposite direction of rotation. More specifically, the right hand collector member 20 (Fig. 4) is arranged as shown in Fig. 5, so that a plane containing the edge 23 of lip 21 and the longitudinal axis of the crank pin, will intersect the plane containing the axes of the crankshaft and crank pin at a substantial angle, whereby the lubricant collecting lip 21 may be more effectively presented to the lubricant vapor in the crankcase, when the crank is rotating in a clockwise direction. The collector 19 is similarly arranged for effectively picking up the lubricant-containing vapor in the opposite direction of crankshaft rotation. The same function will obviously prevail in case the collector members are at times submerged in a body of oil maintained at sufficient depth, as in certain four cycle engines.

The collector members 19 and 20 form end walls for a lubricant chamber or reservoir 29 within the crank pin. As shown in Fig. 4, an aperture 30 extends through a wall portion 31 of the hollow crank pin most distant from the axis of the crankshaft, the aperture being provided to connect the reservoir 29 with the bearing surface of the connecting rod, or the rod-bushing 32 seated in the end 33 of connecting rod 14. A stub conduit 34 is preferably provided in the aperture 30 to conduct lubricant from the chamber 29 to the wearing surface of the bushing 32. The conduit has one end portion 35 extending within the chamber 29 substantially as a standpipe, the standpipe portion 35 being provided for a purpose which will now appear.

In the operation of the engine, lubricant collecting within the chamber 29 will be thrown outwardly toward the portion of the chamber wall farthest from the center of crankshaft rotation, as a result of centrifugal force. Some of the lubricant will be forced through the conduit 34 onto the bearing surface of the bushing 32, thereby lubricating the bushing. The excess lubricant remaining in the chamber will collect about the standpipe portion 35 of the conduit, and will form a body of lubricant 36 extending between wall portions of the lips 21, as illustrated in Fig. 4. The standpipe portion 35 of the conduit prevents a direct flow of lubricant from the body 36 to the bushing 32, and aids in maintaining the body of lubricant within the reservoir 29. Although but a single standpipe conduit is described and illustrated, two or more may be employed, if it be so desired, for example in the case of an extremely long crankpin. The size and diameter of the conduit is preferably predetermined so as to maintain a body of lubricant within the reservoir throughout long periods of engine operation, especially during the operation of the engine at high speeds. The presently described and illustrated standpipe conduit is particularly effective as a means for conducting lubricant to the bushing 32 and for maintaining a reservoir of lubricant within the chamber, but it is to be understood that any other suitable means which will function as effectively as the above described conduit may be employed, as desired.

The presence of a quantity of lubricant within the pin will tend to reduce the operating temperature of the pin and the connecting rod bushing frictionally engaging the pin, because of the inherent function of the oil as a cooling fluid. Furthermore, should the operating temperature of the pin and bushing rise as a result of overload upon the engine, or for any other reason, the lubricant in the reservoir 29 would expand, due to the increased temperature, and overflow into the standpipe 35. Thus the normal flow of lubricant to the bushing would be augmented by the overflow, to provide greater lubrication under critical conditions of engine operation. Lubrication of the parts, as a result of the expansion of the lubricant within the reservoir and the consequent overflow thereof into the standpipe 35, will likewise occur should the normal flow of lubricant be interrupted in any way, such as by a temporary clogging of the lubricant collectors, or momentary dearth of oil supply.

The presently described rod and pin lubricating device provides an automatic lubricant collecting arrangement, wherein oil and/or oil-containing vapor is picked up by the collector elements and directed, under a moderate pressure, to the interior of the crank pin. A portion of the lubricant thus collected, forcibly flows through the standpipe 35, as a result of centrifugal force, to the surfaces to be lubricated, and the excess lubricant, of course, collects and surrounds the standpipe 35, as shown at 36 (Fig. 4). Another feature of the device resides in the fact that the lubricant is substantially separated from the vapor delivered to the chamber 29, as the centrifugal forces created by the rotation of the crankshaft and pin tend to separate the heavier particles from the vapor, hence to separate the heavier lubricant particles from the lighter particles, such as those of gasoline vapor. It will be understood, however, as distinctly an advantage in a two cycle engine, that the fresh cold oil and fuel vapor charges exhibit a distinct cooling effect on the crank pin and other parts within the case, due to the present provisions for circulation.

In order to facilitate the lubrication of the interior working parts of the engine and to aid the collector members in collecting and directing lubricant to the interior of the hollow crankpin, a dipper or splash member 37 is preferably provided in the rod and crankshaft assembly. The dipper which is clearly illustrated in Figs. 2 and 3, may be formed from a flat blank of any suitable rigid material such as sheet metal. The dipper has a blade portion 38 and a flat mounting portion or shank 39, apertured as at 40 to receive therethrough, one of the connecting rod cap screws or bolts 41. The blade portion is preferably twisted about its longitudinal axis substantially as illustrated, so that, as it dips into the body of oil 42 in the crankcase, it will splash the oil and direct the splashed lubricant onto the working parts of the engine and into one or the other of the collector members 19 and 20, depending upon the direction of crankshaft rotation.

As shown, the shank portion of the dipper is secured between face portions 43 and 44 of the connecting rod 14 and the connecting rod cap 45, respectively. The dipper blade portion 38 extends outwardly from the connecting rod preferably in a direction transverse to the axis of the crankshaft. Shims 46 are provided for the proper assembling of the cap 45 and dipper 37 to the connecting rod 14.

Although only one dipper is shown and described, two or more of these dippers may be employed to advantage, securing them to the connecting rod assembly and/or the crankshaft and crankshaft counterweights, as desired. Furthermore, the blade portion 38 of the dipper may be altered in shape to provide for varying conditions of engine operation, or other modified dippers may be readily substituted for the particular form of dipper shown and described.

The presently improved lubrication arrangement for internal combustion engines of the two cycle type, comprising the combination of one or more dippers 37, lubricant collectors 19 and 20, standpipe feed to the connecting rod bushing from the lubricant reservoir 29 within the crank pin, contribute to a smoother operating engine. The positive and certain lubrication of the connecting rod bushing and other internal working parts of the engine as effected by the present invention, result in more uniform speed, power and engine maintenance. Although the combination of the dippers and the connecting rod bushing lubricating device is most desirable, particularly in the case of high speed engines, it is to be understood that although the dippers and collectors definitely coact with and aid each other, either of the devices may be used to the exclusion of the other with greatly improved results in engine operation. Furthermore, any of the conventional lubricating devices, such as lubricant feed holes or ducts in the connecting rod cap and bushing, may be employed in combination with the present devices without affecting or interfering with their operation.

A further advantage resulting from the use of the present improvements, particularly the dipper element, resides in the fact that less lubricant is carried out of the crankcase into the engine cylinder and combustion chamber than occurs when conventional arrangements are employed. Accordingly, carbon deposits in the combustion chamber and on the piston-head surface are greatly reduced, with a consequent improvement in engine efficiency and maintainance.

It is to be understood, of course, that the present description relates only to single embodiments of the invention, and that alterations and modifications may be made therein without departing from the spirit and full intendment of the invention as defined by the following claims.

W claim:

1. An engine crankpin oiling device including in combination with a hollow crankpin, a closure portion at one end of the pin and formed to provide a fluid port therethrough, said port being external of the journal portion of the pin and presented at a substantial angle to a crank circle.

2. An engine crankpin oiling device including in combination with a hollow crank pin, a closure element at one end of the pin, and formed to provide a fluid port therethrough, the port being presented at a substantial angle to the plane of crank rotation and at a substantial angle to the axis of the pin.

3. In combination with a hollow crankpin, a pin oiling device including an end closure element for the pin, a vane projecting externally of the closure element, and a port through the closure, defined in part by said vane, said port being so presented, externally of the crank pin, as to collect a lubricating fluid as a consequence of the orbital movement of the pin.

4. In an engine crankpin oiling device, in combination with a hollow crank pin, a crank case within which the pin operates, and adapted to contain a supply of lubricating fluid, an apertured closure element for one end of the pin, the closure element being deformed adjacent said aperture to provide a fluid-collecting pocket having an open side, the open side of said pocket being presented broadside to the fluid about said pin and arranged to deliver the fluid to the interior of the pin for lubrication purposes.

5. In an engine crankpin oiling device, in combination with a hollow crank pin, a crank case within which the pin operates and adapted to contain a supply of lubrication fluid, an apertured closure element for one end of the pin, the closure element being deformed adjacent said aperture to provide a fluid-collecting pocket having an open side, the open side of said pocket being presented broadside to the fluid about said pin and arranged to deliver the fluid to the interior of the pin for lubrication purposes, and a splash member operable with the crank, being formed and located to deflect oil toward said pocket.

6. In an engine crankshaft assembly, a hollow crankpin, lubricating means for said crankpin including a conduit extending within the hollow pin for conducting lubricant from the interior of the crankpin to the exterior thereof, and a lubricant collector member coacting with the pin to form a lubricant reservoir therein, said collector member including an outwardly extending vane or lip element, adapted to collect and to deliver lubricant to the interior of the hollow crankpin.

7. In an engine crankshaft assembly including a hollow crankpin having a lubricant passage through a wall portion thereof, a lubricant collecting and directing structure on said crankpin, said structure including a pair of relatively inverted oppositely projecting lips, one of which extends outwardly, and the other inwardly of the crankpin, said outwardly extending lip being adapted as a lubricant collector.

8. In a crankpin lubricating device for an engine of crankcase scavenging type, a crankshaft assembly including a hollow crankpin having a lubricant passage through a wall portion thereof, and a plurality of lubricant collecting members coacting with the pin to form a lubricant reservoir therein, each of said members having an outwardly extending, cupped vane adapted to collect and to deliver lubricant to the interior of said hollow crankpin, certain of said vanes being extended at an angle determined according to direction of crankpin rotation.

9. In an engine of crankcase scavenging type, a crankshaft assembly including a hollow crankpin, lubricant collector members carried by the crankpin, and coacting therewith to form a lubricant reservoir within the pin, outwardly extending elements on said members, adapted to collect and to deliver lubricant to said reservoir, said extension elements being angularly disposed with respect to each other whereby only one thereof will be operative in a given direction of crankpin rotation, and a conduit in a wall portion of said crankpin and extending into said lubricant reservoir, for conducting lubricant to the exterior of said crankpin.

10. In an engine of crankcase scavenging type, a crankshaft assembly including a hollow crankpin, lubricant collector-members carried by the crankpin and coacting therewith to provide a lubricant reservoir, said members each having relatively inverted oppositely projecting cup-shaped elements forming a tortuous inlet passage therethrough, and an outlet conduit extending from a point within said lubricant reservoir to the exterior of the crankpin.

11. In an engine of two cycle, crankcase scavenging type, a crankshaft assembly including a hollow crankpin, a lubricant collector member on opposite sides of said hollow crankpin, each thereof having a lip element extending outwardly of the crankpin and a complemental lip extending toward the interior of the hollow crankpin, said lips coacting with the walls of the pin to form a lubricant reservoir therein, said outwardly extending lips being adapted to collect and to deliver lubricant to said reservoir, and a conduit element extending within said lubricant reservoir, adapted to conduct lubricant to the exterior of said hollow crankpin.

12. In an engine of crankcase scavenging type, a crankshaft assembly including a hollow crankpin, lubricant collector members on the crankpin and coacting with the pin to provide a lubricant reservoir therein, each of said collector members having an outwardly extending, cup-shaped lubricant collecting element adapted to collect and to deliver lubricant to said reservoir, the edge-portions of the cup-shaped elements lying in axial planes angularly disposed with respect to each other, and means extending within said reservoir, adapted to deliver lubricant to the exterior of said crankpin.

13. In an engine of crankcase scavenging type, a crankshaft and connecting rod assembly including a hollow crankpin and a connecting rod bushing on said crankpin, lubricant collector means adapted to collect and to deliver lubricant to said hollow crankpin, said means comprising disc elements having outwardly extending lip portions presented to the lubricating fluid about said pin, means for conducting lubricant from a point within the hollow crankpin to said bushing, a crankcase having lubricant therein, and an element carried by the crank end of the rod assembly, for directing crankcase lubricant into the path of said collector means.

14. In an engine of crankcase scavenging type, a crankshaft and connecting rod assembly including a hollow crankpin and a connecting rod operatively engaging the crankpin, lubricant collector members on said crankpin coacting with the pin to provide a lubricant reservoir within the hollow crankpin, said members each having relatively inverted oppositely disposed cup-shaped elements adapted to collect and to deliver lubricant to said reservoir, means extending within said reservoir, for conducting lubricant to the journal surface of said pin, a crankcase having lubricant therein, and means carried by the connecting rod, operable to direct said crankcase lubricant into position to be received by said collector members.

15. In an engine of crankcase scavenging type, a crankshaft assembly including a hollow crankpin, lubricant collector members on said crankpin coacting with the walls of the pin to provide a lubricant reservoir therein, said collector members each having an outwardly extending cup-shaped element adapted to collect and to deliver lubricant to said reservoir, a conduit extending inwardly of the wall of said reservoir and adapted to deliver lubricant to the exterior of said crankpin, a crankcase having lubricant therein, and a dipper element associated with said crankshaft assembly, adapted to splash said crankcase lubricant and to direct the splashed lubricant into position to be picked up by said collector members.

16. In an engine of the reciprocating type, a crankshaft and connecting rod assembly including a hollow crankpin, a crankcase having a body of lubricant therein, a closure element for one end of the hollow pin, characterized by portions projecting beyond the end face of the pin, said portions coacting to pick up and deliver lubricant to the interior of the pin, and coacting with an opposite end closure to retain a body of oil within the pin in any position of the crank.

17. In an engine of crankcase scavenging type, a crankshaft assembly including a hollow crankpin, a pair of lubricant collector members coacting to form a lubricant reservoir within the hollow crankpin, each of said collector-members having an outwardly extending, cup-shaped element adapted to collect and to deliver lubricant to said reservoir, said collector members being angularly related whereby only one of said cup-shaped elements will be operative in a given direction of crankpin rotation, means extending within said reservoir for conducting lubricant to an exterior portion of the crankpin, a crankcase having a body of lubricant therein, and an angular blade element rotatable with said crankpin, adapted to splash said crankcase lubricant into said cup-shaped collector elements.

18. In an engine of the reciprocating type, a crankshaft and connecting rod assembly including a crankpin having an oil receiving and retaining chamber therein, a crankcase providing an oil reservoir about said assembly, and a closure for said crank pin chamber, shaped to present an oil-collecting orifice, the orifice being defined in part by an outwardly projecting lip element having an edge disposed at an angle to the horizontal when the crankpin is in its lowermost position, said closure being shaped to retain a body of oil in the pin in any crank position.

WILLIAM C. DEHN.
MILTON H. RIX.